United States Patent
Rohse et al.

(10) Patent No.: US 11,614,459 B2
(45) Date of Patent: Mar. 28, 2023

(54) PROTECTIVE SLEEVE FOR A REVOLUTION RATE SENSOR

(71) Applicant: KNORR-BREMSE Systeme fuer Nutzfahrzeuge GmbH, Munich (DE)

(72) Inventors: Tobias Rohse, Schwieberdingen (DE); Timo Raiser, Tamm (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 107 days.

(21) Appl. No.: 17/156,375

(22) Filed: Jan. 22, 2021

(65) Prior Publication Data

US 2021/0231699 A1 Jul. 29, 2021

(30) Foreign Application Priority Data

Jan. 28, 2020 (DE) .......................... 102020101937.8

(51) Int. Cl.
*G01P 3/48* (2006.01)
*G01P 3/487* (2006.01)

(52) U.S. Cl.
CPC .................................. *G01P 3/487* (2013.01)

(58) Field of Classification Search
CPC ........... G01P 3/487; G01P 1/026; G01P 3/488
See application file for complete search history.

(56) References Cited

U.S. PATENT DOCUMENTS

| | | | |
|---|---|---|---|
| 5,229,715 A * | 7/1993 | Niino | ...................... G01P 3/488 324/207.13 |
| 5,581,179 A | 12/1996 | Engel et al. | |
| 2019/0011319 A1* | 1/2019 | Ogawa | .................. G01M 15/05 |
| 2019/0041418 A1 | 2/2019 | Tomczak et al. | |

FOREIGN PATENT DOCUMENTS

| | | |
|---|---|---|
| DE | 19612337 A1 | 10/1997 |
| DE | 102007018758 B4 | 5/2019 |
| EP | 3009811 A1 | 4/2016 |

* cited by examiner

*Primary Examiner* — Reena Aurora
(74) *Attorney, Agent, or Firm* — Norton Rose Fulbright US LLP; Gerard Messina; Aaron Deditch

(57) ABSTRACT

A protective sleeve for a revolution rate sensor, in particular for the detection of wheel revolution rates of vehicles. It has: an upper end section, configured to lead electrical connections of the revolution rate sensor out of the protective sleeve, a side wall which connects to the upper end section and extends in the direction of a longitudinal axis, and a lower end section which connects to the side wall, in which the protective sleeve has a recess at its lower end section.

13 Claims, 2 Drawing Sheets

PROTECTIVE SLEEVE FOR A REVOLUTION RATE SENSOR

RELATED APPLICATION INFORMATION

The present application claims priority to and the benefit of German patent application no. 10 2020 101 937.8, which was filed in Germany on Jan. 28, 2020, the disclosure which is incorporated herein by reference.

FIELD OF THE INVENTION

The present invention relates to a protective sleeve for a revolution rate sensor and a revolution rate sensor which is provided for a protective sleeve according to the invention. In particular, the revolution rate sensor is a wheel revolution rate sensor of a vehicle.

BACKGROUND INFORMATION

The detection of wheel revolution rates of vehicles has an important role in modern safety systems. For this purpose, wheel revolution rate sensors are used in today's prior art, which can detect the respective revolution rates of the wheels and transmit them to a control and evaluation device. On the basis of the revolution rate information, a possible slip of a wheel, which could affect driving safety, can be detected and appropriate countermeasures can be initiated by electronic systems such as an anti-lock system or anti-slip controllers.

In this case, active revolution rate sensors have prevailed in the prior art for wheel revolution rate detection, which, in contrast to passive revolution rate sensors, must be supplied with a minimum current and are therefore operated actively. Active revolution rate sensors, which are based on the functional principle of the Hall effect and with respect to which Hall sensors are therefore referred to, are widely used for this. The sensor elements of these sensors usually consist of semiconductor layers, to which a low current is applied. If the sensor element is moved by a magnetic field, a charge separation is caused in the sensor element due to the Lorentz force acting on the electrons, which can be measured in the form of a voltage signal (Hall voltage).

In the case of revolution rate sensors for vehicles, the magnetic field to be measured is usually generated by a permanent magnet and influenced by a so-called encoder (encoder wheel). The encoder wheel is firmly connected to the wheel of the vehicle, the revolution rate of which is to be determined, and therefore rotates at its revolution rate. On the encoder wheel, different sections are defined, which cause a change in the magnetic field. In some embodiments, the encoder wheel has different polarity magnets on the different sections, which interact with a permanent magnet installed in the revolution rate sensor behind the sensor element or a ferromagnetic material placed there. Depending on the section, the magnetic field is thus oriented in one direction or the other (multipole). In another example, the sensor has a permanent magnet, wherein the encoder wheel consists of a ferromagnetic gearwheel. The different distances between a tooth of the gearwheel and the permanent magnet of the sensor on one side and a tooth space of the gearwheel and the permanent magnet of the sensor on the other side induce a change in the magnetic field.

The change of the magnetic field is detected by the sensor element (Hall element) as described above and converted into a voltage signal that fluctuates proportionally to the wheel revolution rate. This is then passed on to a control and evaluation unit of the vehicle, by which the voltage signal of the sensor is processed by filtering, amplification, various correction factors or the like and processed into revolution rate information of the wheel, on the basis of which the driving safety systems can bring about stabilization of the driving situation.

In some embodiments of revolution rate sensors, two or more sensor elements are used, which are arranged side by side. This has the advantage that due to the different positions of the sensor elements relative to the encoder it can be determined in which direction the encoder wheel and thus the wheel of the vehicle is rotating.

A typical structure of a revolution rate sensor is as follows: the at least one sensor element is placed at the end of a conductor rail and electrically connected to it. Furthermore, a permanent magnet is placed behind the sensor element, so that the sensor element is provided between the magnet and the decoder which is to be arranged later. Subsequently, the individual components are encapsulated with plastic, so that the components of the sensor are arranged in the plastic encapsulation without air inclusions. The resulting plastic component with the integrated components is then inserted into a protective sleeve and sealed with an O-ring at its opening for protection against dirt and moisture as well as against mechanical influences.

Such a protective sleeve 10 from the prior art is shown in FIG. 1. It consists of an upper end section 11, a side wall 12 and a lower end section 13. All sections extend with a circular cross-section along a longitudinal axis L, which also represents the axis of symmetry of the protective sleeve 10. While the cylindrical shape formed by the three sections has an opening at the upper end section 11, it is terminated at the opposite end, i.e. at the lower end section, by a bottom surface which is not shown in the figure. In addition, at the upper end section 11 the protective sleeve 10 has a larger diameter than the rest of the protective sleeve 10 and a groove in the lower end section 13. The exact shape of the protective sleeve 10 depends on the shape of the revolution rate sensor 20 to be inserted into it.

A revolution rate sensor 20 (see FIG. 2) is inserted into the protective sleeve 10 through the opening at the upper end section 11 and is inserted as far as possible into the protective sleeve 10. In addition, the gap at the upper end section 11 between the sleeve 10 and the sensor 20 is sealed with an O-ring (not shown). Thus, the sensor 20 is protected from mechanical influences and air or liquid or dirt ingress through the protective sleeve 10.

FIG. 2 shows schematically the lower part of the protective sleeve from FIG. 1 in a sectional view along the longitudinal axis L. Thus, the protective sleeve is to be seen with the side wall 12 and the lower end section 13, as well as a bottom surface 14 of the protective sleeve 10. The protective sleeve has a constant wall thickness t. In addition, a revolution rate sensor 20 is shown in FIG. 2, which is inserted into the protective sleeve 10. This has a permanent magnet 22 as well as a sensor element 21, wherein the latter has an electrical connection which is not shown, and which leads upwards out of the protective sleeve 10 in the plane of the drawing and which can conduct the electrical signals from the sensor element 21 to an evaluation unit or similar. The revolution rate sensor 20 also has a plastic encapsulation 23, which encloses the sensor element 21 and the permanent magnet 22 and completely fills the volume between the sensor element 21, the permanent magnet 22 and the protective sleeve. Thus, there is a plastic layer with the defined layer thickness d between the sensor element 22 and the bottom surface 14 of the protective sleeve.

In addition, a ferromagnetic gearwheel is schematically shown in FIG. 2, which serves the sensor 20 as an encoder wheel or encoder 30 and which is firmly connected to a vehicle axle (not shown) of a vehicle wheel. The distance between the point of the encoder wheel 30 which is closest to the ground surface 14 of the protective sleeve 10 and the bottom surface 14 of the protective sleeve 10 is referred to as an air gap I. Due to the ferromagnetic property of the encoder wheel 30, there is a magnetic field between the permanent magnet 22 of the revolution rate sensor 20 and the encoder wheel 30. This leads through the above-described functional principle of the sensor to a voltage, which is induced by the sensor element 21. If the encoder wheel 30 rotates together with the wheel of the vehicle, the revolution rate of which is to be determined, the distance between the magnet and the encoder wheel changes due to the tooth shape of the encoder wheel 30, thereby changing the magnetic field and thus also the voltage induced in the sensor element 21. Due to the known distance of the teeth on the encoder wheel 30, its revolution rate and thus the revolution rate of the vehicle wheel can be determined.

In practice, there can be rapid fluctuations of the air gap I if the encoder wheel is not manufactured with a high dimensional accuracy or deforms during operation due to thermal or mechanical influences, which can lead to a deterioration of the measurement results of the sensor. This places high demands on the quality of the encoder wheel used as well as on the tolerances of the vehicle axle on which the encoder wheel is positioned, which increases the production effort and thus the production costs of the corresponding components. Since deviations in the air gap may only occur for longer-term components due to the above-mentioned deformations or other influences, the components which have an influence on the air gap must be checked more frequently and repaired in order to ensure a consistent air gap and thus a smooth operation of the sensor, which entails costs.

SUMMARY OF THE INVENTION

It is therefore an object of the present invention to provide a solution by which the quality requirements of the encoder can be minimized. This is achieved by a protective sleeve and a revolution rate sensor according to the independent claims. Advantageous further developments of the invention are contained in the dependent claims.

A protective sleeve according to the invention for accommodating a revolution rate sensor with at least one sensor element has an upper end section, a side wall, and a lower end section. The side wall can transition into both the lower end section and the upper end section. Parts of the side wall can thus also form components of the lower and upper end sections. The upper end section may be configured to lead electrical connections of the revolution rate sensor placed in the protective sleeve out of the arrangement through an opening, which may be upwards, wherein the upper end is defined as the end that is opposite to the end of the protective sleeve, which is to be mounted closer to an encoder, which may be specified, for example, in the form of an encoder wheel. The side wall is adjacent to the upper end section and extends in the direction of a longitudinal axis of the protective sleeve. The lower end section of the protective sleeve adjoins the side wall in the direction of the longitudinal axis. As mentioned above, the upper end section can transition into the side wall and the side wall can transition into the lower end section without the respective sections being separated from each other by clear geometric features. According to the invention, the protective sleeve has a recess at its lower end section.

Due to the recess in the lower end section, it can be achieved that the sensor element can be arranged closer to the encoder, which is explained in more detail below. The distance between the encoder and the point closest to the encoder of the revolution rate sensor with the protective sleeve (air gap, see above) remains unchanged compared to conventional solutions. The revolution rate sensor also remains unchanged compared to conventional solutions and thus also does the layer thickness of the plastic encapsulation, which is located between the encoder and the sensor element. With the same air gap and the same layer thickness of the plastic encapsulation, the sensor element thus slides closer to the encoder by the thickness of the protective sleeve (see explanations for FIG. 3). This has the advantage that fluctuations in the air gap can be compensated much better and therefore a sufficiently accurate measurement of the wheel revolution rate can be carried out even with lower quality encoders. Thus, older or cheaper encoders can also be used, which reduces the procurement costs and/or the maintenance costs of the system of the encoder and the revolution rate sensor.

In an advantageous embodiment of the invention, the conventional revolution rate sensor to be inserted in the protective sleeve protrudes out of the protective sleeve at a specified distance from the lower end section of the protective sleeve. Thus, there is no section of the protective sleeve between the encoder wheel and the revolution rate sensor, which is why the protective sleeve is only a lateral sheathing of the revolution rate sensor and is made open at the bottom. This has the advantage that a simple geometric shape of the protective sleeve is ensured, which enables favorable manufacturing costs. At the same time, the vast majority of the revolution rate sensor is laterally protected from mechanical influences.

In a further advantageous embodiment of the invention, the revolution rate sensor terminates flush with the lower end section of the protective sleeve. A simple geometric shape of the protective sleeve is also guaranteed in this embodiment, wherein even a larger part of the revolution rate sensor can be laterally protected against mechanical influences, since the protective sleeve extends over the entire side surface of the revolution rate sensor and thus only the end face of the revolution rate sensor is not protected by the protective sleeve. In addition, the arrangement results in a simple form of the overall geometry of the protective sleeve and the revolution rate sensor, in which no corners or beading form in which dirt could be deposited and thus could interfere with the function of the sensor or cause more frequent maintenance.

In a further advantageous embodiment of the invention, the lower end section has a bottom surface, which is configured to limit the side wall in the direction of the longitudinal axis of the protective sleeve. The recess at the lower end section of the protective sleeve is located in this bottom surface. The recess is also filled by the plastic encapsulation, so that it terminates flush with the bottom surface of the protective sleeve.

Such an embodiment has the advantage that the revolution rate sensor and in particular its plastic encapsulation are also protected against mechanical influences from the side oriented to the encoder. This is particularly important if the encoder has an imbalance and thus possibly grinds on the arrangement of the protective sleeve and the revolution rate sensor, or in the case of a possible calibration of the sensor, in which the encoder is arranged so close to the arrangement of the revolution rate sensor and the protective sleeve that it grinds slightly on the arrangement (the air gap is thus set equal to 0).

In an advantageous development of the last described embodiment, the recess at the lower end section of the protective sleeve is arranged in the middle of the bottom surface. This presupposes that the sensor element is also arranged in the middle and a symmetry can be achieved around the longitudinal axis of the protective sleeve. A symmetrical arrangement has advantages in particular with regard to the configuration, manufacture, and assembly of the components, whereby the price of the manufacture of the arrangement can be reduced.

In an advantageous further development of the embodiment with a recess in the bottom surface of the protective sleeve, the area of the recess in the bottom surface of the protective sleeve corresponds to at least 50% of the end surface of the sensor element which is required to determine the revolution rate, and/or no more than 1.3 times the end surface of the sensor element which is required to determine the revolution rate, and which may be exactly the proportion of the end surface of the sensor element which is required to determine the revolution rate. The area required to determine the revolution rate is the proportion of the end surface of the sensor element through which flows the magnetic field between the encoder and the magnet, or depending on the embodiment, the ferromagnetic element of the revolution rate sensor, and causes the induction of the voltage. In the case of the Hall sensors described above, this area usually corresponds to the area of the semiconductor layers of the sensor element.

In order to ensure the function of the operating principle of the revolution rate sensor, a certain minimum area of the recess in the bottom surface will be provided. On the other hand, a reasonable upper limit of the area size should be established in order to ensure sufficient protection by the protective sleeve. Ideally, the recess of the protective sleeve is no larger than that which can ensure reliable operation of the revolution rate sensor.

In a further advantageous embodiment of the invention, the recess in the bottom surface of the lower end section of the protective sleeve has the same shape as the area of the sensor element which is required for determining the revolution rate. Here too, the aim is to keep the unprotected region of the revolution rate sensor as small as possible and at the same time to ensure reliable operation of the revolution rate sensor. By making the recess the same shape as the surface of the sensor element, this can be achieved in the best possible way. The term "same shape" refers to the mathematical property of similarity, so that the recess in the bottom surface may well have a different surface content to the surface of the sensor element.

Furthermore, the mode of operation of the revolution rate sensor can be improved, and thus its reliable operation can be ensured, if the recess in the bottom surface and the surface of the sensor element are arranged in parallel, which thus represents a further advantageous embodiment of the invention. This is due to the fact that in this case the layer thickness of the plastic encapsulation over the entire surface of the sensor element and thus also the air gap between the revolution rate sensor and the encoder are as constant as possible, which in turn results in a magnetic field that is as constant as possible.

In a further advantageous embodiment of the invention, the protective sleeve has a symmetrical shape, wherein the longitudinal axis of the protective sleeve represents the axis of symmetry of the protective sleeve. A symmetrical shape brings advantages in terms of manufacturing and assembly effort, since there is no need to orient the component. This saves time and costs.

This embodiment is further advantageous if the protective sleeve extends around the longitudinal axis, which acts as an axis of symmetry, i.e. with a round cross-section transverse to the longitudinal axis. A round shape of the protective sleeve has the advantage that it is easy to manufacture and, due to the round cross-section, represents a stable shape for transverse loads.

A revolution rate sensor according to the invention, which is configured to be inserted into a protective sleeve as claimed in claim 4, has at least one sensor element, which is configured to detect the revolution rate of an encoder and to convert this revolution rate into an electrical signal. In addition, a revolution rate sensor according to the invention has an electrical connection, which is configured to forward the electrical signal detected by the sensor element to a receiver outside the revolution rate sensor for further processing. There, the signal is further processed and evaluated. Furthermore, the revolution rate sensor has a permanent magnet, which is configured to build up a magnetic field. In addition, the sensor element, the permanent magnet, and the electrical connection are surrounded by a plastic encapsulation, which is configured to protect the surrounding parts and fix their arrangement. The plastic encapsulation according to the invention further has a protrusion at its end, which is configured in such a way that it can be inserted into the recess provided at the lower end section of the protective sleeve in such a way that the plastic encapsulation terminates flush with the bottom surface of the lower end section of the protective sleeve.

Such a revolution rate sensor can be inserted into a protective sleeve according to the invention as claimed in claim 4, whereby it can be achieved that the sensor element of the revolution rate sensor can be positioned closer to the encoder by the thickness of the bottom surface of the sleeve, whereby possible fluctuations in the air gap between the encoder and the revolution rate sensor, which can occur in operation, can be better compensated. On the one hand, this also allows the use of older encoders, which may be worn or deformed by operation. This results in a longer lifetime performance for the encoders, which do not have to be maintained as often at the same time. On the other hand, lower quality encoders with lower manufacturing accuracy can also be used. In this way, a revolution rate sensor according to the invention in conjunction with a protective sleeve as claimed in claim 4 allows the use of qualitatively inferior or older encoders. This can reduce both maintenance costs and acquisition costs.

In an advantageous embodiment of the revolution rate sensor, a component of a ferromagnetic material is used instead of the permanent magnet. This presupposes that a suitable encoder is used, which in turn has a permanent magnet to generate a magnetic field.

The present invention is explained in more detail below on the basis of the figures.

BRIEF DESCRIPTIONS OF THE DRAWINGS

DETAILED DESCRIPTION

Figure 1:
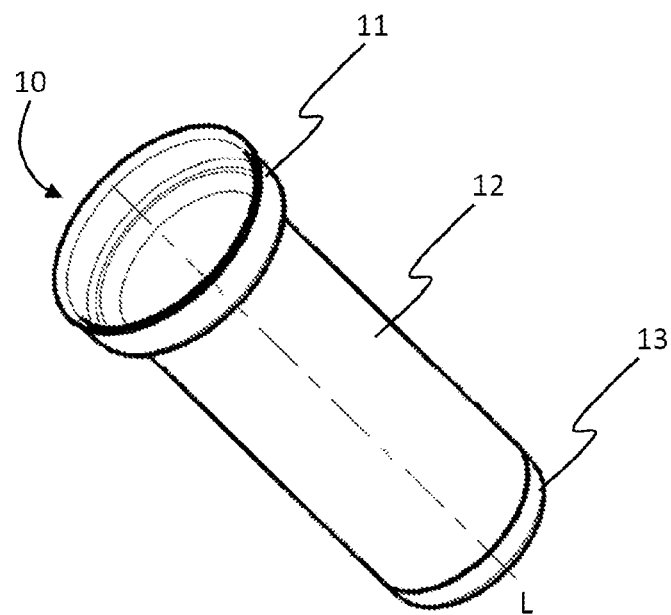
FIG. 1 shows a perspective view of a conventional protective sleeve for a revolution rate sensor.
Figure 2:
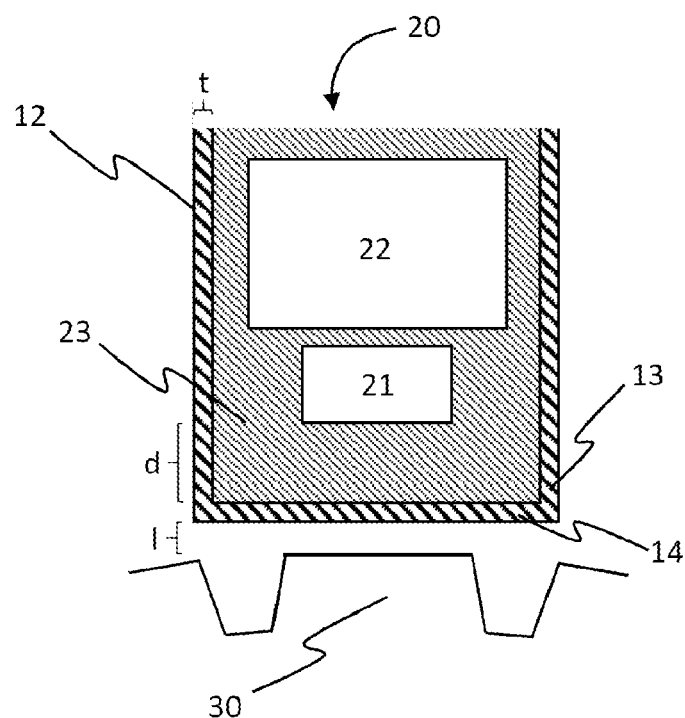
FIG. 2 shows a sectional view of a conventional revolution rate sensor in a conventional protective sleeve.

FIGS. 1 and 2 have already been described in detail above. Therefore, a detailed description is omitted at this point and only the most important points are addressed. FIG. 1 shows a conventional protective sleeve as it is known from the prior art. It extends along a longitudinal axis L, is round in its cross-section and is open at one end.

FIG. 2 shows only a section in a sectional view of the protective sleeve 10 from FIG. 1 along its longitudinal axis L. The section shown is opposite the open end of the protective sleeve and shows a side wall 12 and a lower end section 13 of the protective sleeve. A revolution rate sensor 20 is provided in the protective sleeve 10. As can be seen, at the end opposite the open end the protective sleeve 10 is closed by a bottom surface 14. An encoder in the form of a gear-shaped encoder wheel 30 is sketched in connection with the bottom surface. There is an air gap I between the bottom surface 14 and the encoder wheel 30. The revolution rate sensor 20 consists of a sensor element 21 and a permanent magnet 22, wherein the sensor element 21 is arranged between the bottom surface 14 and the permanent magnet 22.

The permanent magnet 22 and the sensor element 21 are surrounded by plastic encapsulation 23, which fills the entire protective sleeve 10 in the section shown and fixes the components of the revolution rate sensor.

The layer thickness d of the plastic encapsulation between the sensor element 21 and the bottom surface 14 has a predetermined value, which is identical in each of FIGS. 2 to 5. Furthermore, the protective sleeve 10 has a constant predetermined wall thickness t. The distance from the encoder wheel 30 to the sensor element 21 is thus fixed to the sum of the values of the air gap I, the wall thickness t of the bottom surface 14 of the protective sleeve 10 and the layer thickness d of the plastic encapsulation 23.

If the encoder wheel 30 has greater dimensional inaccuracies, for example due to deformations or a worn state, larger fluctuations of the air gap I can occur during operation. These may not be able to be compensated, which may distort the result of the revolution rate sensor. To prevent this, high-quality and accordingly expensive encoder wheels must be used and/or frequent maintenance/replacement of the affected parts must be carried out in order to minimize the fluctuations of the air gap.

Figure 3:
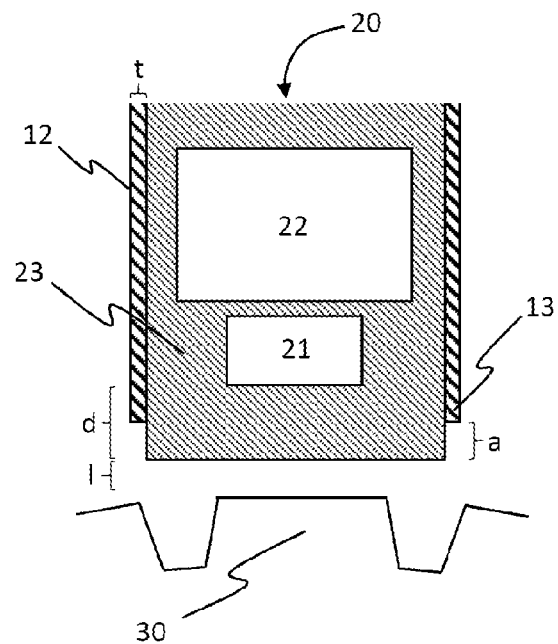
FIG. 3 shows a sectional view of a first embodiment of a protective sleeve according to the invention with a conventional revolution rate sensor.

FIG. 3 shows a first embodiment of a protective sleeve 10 according to the invention in the section known from FIG. 2 and with the revolution rate sensor 20 already known from FIG. 2 above a sketched encoder wheel 30. In contrast to the protective sleeve 10 from FIG. 2, the protective sleeve 10 from FIG. 3 has no bottom surface 14 and is therefore open below. The revolution rate sensor 20 with its plastic encapsulation 23 rather protrudes out of the lower end section 13 of the protective sleeve by the distance a. In this way, the distance between the sensor element 21 and the encoder wheel 30 is only the layer thickness d of the plastic encapsulation 23, added to by the size of the air gap I. The distance was therefore reduced by the thickness of the wall thickness t of the omitted bottom surface 14 of the protective sleeve 10. This makes it easier to compensate for fluctuations in the air gap, which reduces the quality requirements with regard to the encoder wheel 30.

Figure 4:
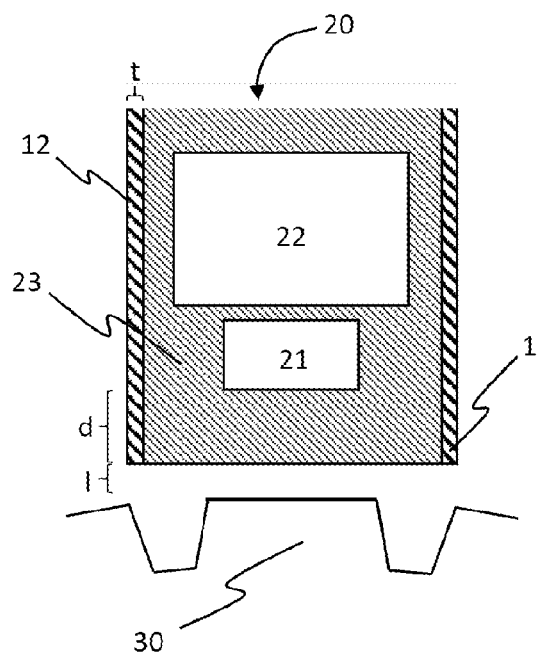
FIG. 4 shows a sectional view of a second embodiment of a protective sleeve according to the invention with a conventional revolution rate sensor.

FIG. 4 shows a second embodiment of a protective sleeve 10 according to the invention in the section known from FIG. 2 and with the revolution rate sensor 20 known from FIG. 2. Therefore at this point only the differences from the previous first embodiment of the invention from FIG. 3 are discussed. In contrast to the embodiment of the invention shown in FIG. 3, the revolution rate sensor 20 terminates flush with the lower end section 13 of the protective sleeve 10. Thus, a larger area of the revolution rate sensor 20 can be covered and protected by the protective sleeve 10. In addition, the resulting geometry, in contrast to the embodiment of FIG. 3, has no feature between the protective sleeve 10 and the revolution rate sensor 20 in which dirt could possibly accumulate.

Figure 5:
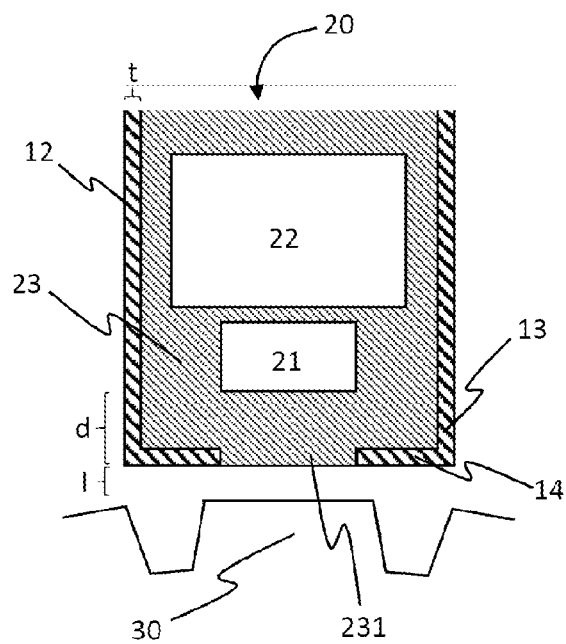
FIG. 5 shows a sectional view of a third embodiment of a protective sleeve according to the invention with a revolution rate sensor according to the invention.

FIG. 5 shows a third embodiment of a system of a protective sleeve 10 according to the invention and a revolution rate sensor 20' according to the invention. The protective sleeve 10 from FIG. 5 has a bottom surface 14 in which a recess is arranged. The recess is arranged in the middle of the bottom surface and has an area corresponding to the end face of the sensor element 21.

Furthermore, a revolution rate sensor 20' is provided, in which the plastic encapsulation 23 has a protrusion 231, which corresponds exactly to the shape of the recess in the bottom surface 14 of the protective sleeve 10. If the revolution rate sensor 20' with its protrusion 231 is inserted into the protective sleeve 10, the protrusion 231 of the plastic encapsulation exactly fills the hole in the recess in the bottom surface 14 of the protective sleeve 10 and terminates flush with the bottom surface 14. In this way, the distance from the sensor element 21 to the encoder wheel 30 can also be reduced by the wall thickness t of the protective sleeve 10 in comparison to conventional protective sleeves 10 and revolution rate sensors 20, and a comprehensive protection of the revolution rate sensor 20 can be ensured at the same time.

THE REFERENCE CHARACTER LIST IS AS FOLLOWS 10 protective sleeve
11 upper end section
12 side wall of the protective sleeve
13 lower end section
14 bottom surface of the protective sleeve
20 revolution rate sensor
21 sensor element
22 permanent magnet/ferromagnetic element
23 plastic encapsulation
231 protrusion
30 encoder(-element) (gearwheel)
L longitudinal axis
a distance from the revolution rate sensor to the protective sleeve
d thickness of the plastic encapsulation
t wall thickness of the protective sleeve

The invention claimed is:
1. A protective sleeve for accommodating a revolution rate sensor with at least one sensor element, comprising:
an upper end section to lead electrical connections of the revolution rate sensor out of the protective sleeve;

a side wall that connects to the upper end section and extends in the direction of a longitudinal axis; and
a lower end section that connects to the side wall;
wherein the protective sleeve has a recess at the lower end section, and
wherein the lower end section has a bottom surface, to limit the side wall in the direction of the longitudinal axis of the protective sleeve, and wherein the recess at the lower end section of the protective sleeve is located in the bottom surface and is filled by the plastic encapsulation, so that the plastic encapsulation and the bottom surface are flush.

2. The protective sleeve of claim 1, wherein the recess at the lower end section of the protective sleeve is arranged in the middle in the bottom surface.

3. The protective sleeve of claim 2, wherein the area of the recess in the bottom surface of the protective sleeve corresponds to at least 0.5 times the area of the sensor element which is required to determine the revolution rate, and/or to no more than 1.3 times the area of the sensor element which is required to determine the revolution rate, and which may be to exactly the area of the sensor element which is required to determine the revolution rate.

4. The protective sleeve of claim 3, wherein the shape of the recess in the bottom surface of the protective sleeve corresponds to the shape of the surface of the sensor element required for determining the revolution rate, and/or the recess and the surface of the sensor element are arranged parallel to each other.

5. The protective sleeve of claim 1, wherein the protective sleeve is formed with a round cross-section symmetrically around the longitudinal axis.

6. The protective sleeve of claim 1, wherein the protective sleeve extends in the direction of the longitudinal axis.

7. The protective sleeve of claim 1, wherein the area of the recess in the bottom surface of the protective sleeve corresponds to at least 0.5 times the area of the sensor element which is required to determine the revolution rate, and/or to no more than 1.3 times the area of the sensor element which is required to determine the revolution rate, and which may be to exactly the area of the sensor element which is required to determine the revolution rate.

8. The protective sleeve of claim 1, wherein the shape of the recess in the bottom surface of the protective sleeve corresponds to the shape of the surface of the sensor element required for determining the revolution rate, and/or the recess and the surface of the sensor element are arranged parallel to each other.

9. A protective sleeve for accommodating a revolution rate sensor with at least one sensor element, comprising:
an upper end section to lead electrical connections of the revolution rate sensor out of the protective sleeve;
a side wall that connects to the upper end section and extends in the direction of a longitudinal axis; and
a lower end section that connects to the side wall;
wherein the protective sleeve has a recess at the lower end section,
wherein the recess corresponds to a cross-sectional shape of the lower end section and the protective sleeve has a length along the longitudinal axis, so that the revolution rate sensor and the plastic encapsulation are arranged in the protective sleeve so as to protrude out of the lower end section of the protective sleeve by a specified distance, and
wherein the protective sleeve has no bottom surface and is open below, wherein the revolution rate sensor and the plastic encapsulation protrude out of the lower end section of the protective sleeve by a distance "A", so that a distance between the sensor element and the encoder element is only a layer thickness "D" of the plastic encapsulation, added to by a size of an air gap "L".

10. A protective sleeve for accommodating a revolution rate sensor with at least one sensor element, comprising:
an upper end section to lead electrical connections of the revolution rate sensor out of the protective sleeve;
a side wall that connects to the upper end section and extends in the direction of a longitudinal axis; and
a lower end section that connects to the side wall;
wherein the protective sleeve has a recess at the lower end section, and
wherein the recess corresponds to a cross-sectional shape of the lower end section and the protective sleeve has a length along the longitudinal axis, so that the revolution rate sensor and the plastic encapsulation are arranged in the protective sleeve so as to terminate flush with the protective sleeve and thus the lower end section, and
wherein the protective sleeve has no bottom surface and is open below, wherein the revolution rate sensor and the plastic encapsulation are flush with the lower end section of the protective sleeve, so that a distance between the sensor element and the encoder element is only a layer thickness "D" of the plastic encapsulation, added to by a size of an air gap "L".

11. A revolution rate sensor for inserting into a protective sleeve, comprising:
a permanent magnet to generate a magnetic field;
at least one sensor element in an area of the magnetic field to detect the revolution rate of an encoder element assigned to the revolution rate sensor and to convert it into an electrical signal;
a plastic encapsulation arranged around the permanent magnet and the sensor element to protect the sensor element and fix in place the permanent magnet and the sensor element;
wherein the plastic encapsulation has a protrusion which fills a recess formed in the lower end section of the protective sleeve and terminates flush with the bottom surface of the lower end section of the protective sleeve, and
wherein the protective sleeve accommodates the revolution rate sensor with the at least one sensor element, and includes:
an upper end section to lead electrical connections of the revolution rate sensor out of the protective sleeve;
a side wall that connects to the upper end section and extends in the direction of a longitudinal axis; and
a lower end section that connects to the side wall, wherein the protective sleeve has the recess at the lower end section, and
wherein the protective sleeve has no bottom surface and is open below, wherein the revolution rate sensor and the plastic encapsulation are flush with the lower end section of the protective sleeve, so that a distance between the sensor element and the encoder element is only a layer thickness "D" of the plastic encapsulation, added to by a size of an air gap "L".

12. The revolution rate sensor of claim 11, wherein the revolution rate sensor has a ferromagnetic element for generating a magnetic field.

13. A system, comprising:
- a protective sleeve for accommodating a revolution rate sensor with at least one sensor element, including:
  - an upper end section to lead electrical connections of the revolution rate sensor out of the protective sleeve;
  - a side wall that connects to the upper end section and extends in the direction of a longitudinal axis; and
  - a lower end section that connects to the side wall, wherein the protective sleeve has a recess at the lower end section; and
- a revolution rate sensor inserted into the protective sleeve, including:
  - a permanent magnet to generate a magnetic field;
  - at least one sensor element in an area of the magnetic field to detect the revolution rate of an encoder element assigned to the revolution rate sensor and to convert it into an electrical signal;
  - a plastic encapsulation arranged around the permanent magnet and the sensor element to protect the sensor element and fix in place the permanent magnet and the sensor element;
- wherein the plastic encapsulation has a protrusion which fills the recess formed in the lower end section of the protective sleeve and terminates flush with the bottom surface of the lower end section of the protective sleeve, and
- wherein the protective sleeve accommodates the revolution rate sensor with the at least one sensor element section, and
- wherein the protective sleeve has no bottom surface and is open below, wherein the revolution rate sensor and the plastic encapsulation are flush with the lower end section of the protective sleeve, so that a distance between the sensor element and the encoder element is only a layer thickness "D" of the plastic encapsulation, added to by a size of an air gap "L".

* * * * *